United States Patent
Wenning et al.

(10) Patent No.: US 7,300,979 B2
(45) Date of Patent: Nov. 27, 2007

(54) POWDER COATING COMPOSITIONS COMPRISING URETHANE (METH)ACRYLATES AND MICRONIZED WAXES AND THEIR USE

(75) Inventors: Andreas Wenning, Nottuln (DE); Emmanouil Spyrou, Dorsten (DE)

(73) Assignee: Degussa A.G., Duesseldorf (DE)

( * ) Notice: Subject to any disclaimer, the term of this patent is extended or adjusted under 35 U.S.C. 154(b) by 468 days.

(21) Appl. No.: 10/940,623

(22) Filed: Sep. 15, 2004

(65) Prior Publication Data

US 2005/0075411 A1    Apr. 7, 2005

(30) Foreign Application Priority Data

Oct. 4, 2003    (DE) ............... 103 46 118

(51) Int. Cl.
*C08L 75/02*    (2006.01)
*C08G 18/30*    (2006.01)

(52) U.S. Cl. ............... 525/167; 428/407; 428/402.22; 524/590; 524/820; 524/853

(58) Field of Classification Search ........... 402/402.22, 402/407; 525/167; 524/590, 820, 853
See application file for complete search history.

(56) References Cited

U.S. PATENT DOCUMENTS

2002/0099127 A1    7/2002    Wenning et al.

FOREIGN PATENT DOCUMENTS

| | | |
|---|---|---|
| DE | 100 58 617 A1 | 5/2002 |
| DE | 101 63 825 A1 | 7/2003 |
| DE | 101 63 826 A1 | 7/2003 |
| DE | 101 63 827 A1 | 7/2003 |
| EP | 1 411 096 | 4/2004 |

*Primary Examiner*—Robert D. Harlan
(74) *Attorney, Agent, or Firm*—Oblon, Spivak, McClelland, Maier & Neustadt, P.C.

(57) ABSTRACT

Light-stable and weather-stable coating films contain a powder coating composition, containing from 30 to 98.5% by mass of a binder containing at least one urethane (meth) acrylate having a melting point of from 40 to 130° C.; from 1 to 20% by mass of at least one micronized wax; and from 0.5 to 50% by mass of at least one auxiliary and/or at least one additive, the composition being cross-linked by actinic radiation.

27 Claims, No Drawings

POWDER COATING COMPOSITIONS COMPRISING URETHANE (METH)ACRYLATES AND MICRONIZED WAXES AND THEIR USE

BACKGROUND OF THE INVENTION

1. Field of the Invention

The present invention relates to a powder coating composition curable with actinic radiation which is based on urethane (meth)acrylate and micronized wax and which crosslinks to a light-stable and weather-stable coating film.

2. Description of the Related Art

By actinic radiation is meant electromagnetic radiation such as X-rays, UV radiation, visible light or near IR light (NIR), especially UV radiation, or corpuscular radiation such as electron beams.

Interest is gaining in powder coating materials curable with actinic radiation. The reason lies in the lower thermal load on the substrates, allowing, for example, even wood, wood materials, plastics or certain temperature-sensitive metals or metal alloys to be coated. Moreover, owing to the separation of melting from curing, UV powder coating films display a better surface smoothness than heat-curable powder coating materials. Powder coating materials curable with actinic radiation are described in numerous patents.

Urethane (meth)acrylates represent an important class of binder for radiation-curable powder coating materials. The powder coating compositions produced from them crosslink to light-stable and weather-stable, flexible, and hard films. They are described in, for example, DE 100 58 617, DE 101 63 825, DE 101 63 826 or DE 101 63 827.

The films of these above-described powder coating compositions based on the urethane (meth)acrylates, however, do not possess special surface properties such as, in particular, gloss reduction or texture.

SUMMARY OF THE INVENTION

It is an object of the present invention to provide powder coating compositions curable with actinic radiation which, following the curing of the coating films, lead to coatings which simultaneously are stable to external weathering and feature good adhesion, low gloss, and a textured surface.

This and other objects have been achieved by the present invention the first embodiment of which includes a powder coating composition, comprising:

I. from 30 to 98.5% by mass of a binder comprising at least one urethane (meth)acrylate having a melting point of from 40 to 130° C.;

II. from 1 to 20% by mass of at least one micronized wax; and

III. from 0.5 to 50% by mass of at least one auxiliary and/or at least one additive;

wherein said composition is curable with actinic radiation.

In another embodiment, the present invention relates to a method of preparing a powder coating composition, comprising:

mixing

I. from 30 to 98.5% by mass of a binder comprising at least one urethane (meth)acrylate having a melting point of from 40 to 130° C.;

II. from 1 to 20% by mass of at least one micronized wax; and

III. from 0.5 to 50% by mass of at least one auxiliary and/or at least one additives;

wherein said powder coating composition is curable with actinic radiation.

In yet another embodiment, the present invention relates to coating, comprising:

the above powder coating composition.

In another embodiment, the present invention relates to a method of coating a substrate, comprising:

coating said substrate with the above powder coating composition.

DETAILED DESCRIPTION OF THE INVENTION

Surprisingly it has been found possible to achieve the above objects using a radiation-curable powder coating composition comprising as binder at least one amorphous and/or crystalline urethane acrylate having a melting point of from 40 to 130° C., at least one micronized wax, and further auxiliaries and additives.

The present invention provides powder coating compositions curable with actinic radiation and comprising I. from 30 to 98.5% by mass of a binder comprising at least one urethane (meth)acrylate having a melting point of from 40 to 130° C.;

II. from 1 to 20% by mass of at least one micronized wax; and

III. from 0.5 to 50% by mass of further auxiliaries and additives.

The amounts are given based on the total mass of the composition.

The amount of binder includes all values and subvalues therebetween, especially including 35, 40, 45, 50, 55, 60, 65, 70, 75, 80, 85, 90 and 95% by mass.

The melting point of the urethane acrylate includes all values and subvalues therebetween, especially including 45, 50, 55, 60, 65, 70, 75, 80, 85, 90, 95, 100, 105, 110, 115, 120 and 125° C.

The amount of micronized wax includes all values and subvalues therebetween, especially including 2, 4, 6, 8, 10, 12, 14, 16 and 18% by mass.

The amount of auxiliaries and additives includes all values and subvalues therebetween, especially including 1, 2, 3, 4, 5, 10, 15, 20, 25, 30 35, 40 and 45% by mass.

The present invention further provides a process for preparing powder coating compositions curable with actinic radiation and comprising I. from 30 to 98.5% by mass of a binder comprising at least one urethane (meth)acrylate having a melting point of from 40 to 130° C.;

II. from 1 to 20% by mass of at least one micronized wax; and

III. from 0.5 to 50% by mass of further auxiliaries and additives, at temperatures from 40 to 150° C., in particular in heatable kneading apparatus, especially extruders, observing an upper temperature limit of between 120° C. and 150° C.

The amount of binder includes all values and subvalues therebetween, especially including 35, 40, 45, 50, 55, 60, 65, 70, 75, 80, 85, 90 and 95% by mass.

The melting point of the urethane acrylate includes all values and subvalues therebetween, especially including 45, 50, 55, 60, 65, 70, 75, 80, 85, 90, 95, 100, 105, 110, 115, 120 and 125° C.

The amount of micronized wax includes all values and subvalues therebetween, especially including 2, 4, 6, 8, 10, 12, 14, 16 and 18% by mass.

The amount of auxiliaries and additives includes all values and subvalues therebetween, especially including 1, 2, 3, 4, 5, 10, 15, 20, 25, 30 35, 40 and 45% by mass.

The reaction temperature includes all values and subvalues therebetween, especially including 45, 50, 55, 60, 65, 70, 75, 80, 85, 90, 95, 100, 105, 110, 115, 120, 125, 130, 135, 140 and 145° C. The upper temperature limit includes all values and subvalues therebetween, especially including 125, 130, 135, 140 and 145° C.

The present invention also provides a coating made from the above coating composition and a method of coating.

Preferably, the urethane (meth)acrylate I of the present invention comprises a hydroxyl-containing polymer to which urethane groups and (meth)acrylate groups are attached by reaction with i) di- and/or polyisocyanates and ii) (meth)acrylate-containing alcohols.

The urethane (meth)acrylate I used in accordance with the present invention may be amorphous or (semi)crystalline in nature. Any desired mixtures of amorphous and (semi) crystalline urethane (meth)acrylates can also be used.

The preparation of the amorphous and/or crystalline urethane acrylates used in accordance with the present invention is described in more detail in, for example, DE 100 58 617, DE 101 63 825, DE 101 63 826, DE 101 63.827 or DE 102 06 483.0.

Preferably, the micronized wax II is a pulverulent product having a melting point of at least 40° C. It comprises very fine particles. Preferably, the average particle size distribution $d_{50}$ is below 50 μm, preferably below 10 μm. The average particle size distribution includes all values and subvalues therebetween, especially including 1, 2, 3, 4, 5, 6, 7, 8, 9, 10, 15, 20, 25, 30, 35, 40 and 45 μm.

Preferably, the micronized wax comprises, for example, polyamides, polyethylenes, polytetrafluoroethylenes or polypropylenes. More preferred are mixtures of different types of wax or modifications of these polymers.

Mixtures of polyethylene and polytetrafluoroethylene waxes are most preferred. They are particularly suitable in accordance with the present invention and reduce the gloss of a coating and give it texture.

Waxes of this kind available commercially are, for example, Ceraflour® 960, Ceraflour® 961, Ceraflour® 967, Ceraflour® 968, Ceraflour® 969, Ceraflour® 990, Ceraflour® 996, Ceraflour® 430 RC 836 (all from Byk-Cera bv), Lanco® 1840, and Lanco® TF 1830 (from Lubrizol Coating Additives GmbH).

Suitable radiation for curing the powder coating composition of the present invention is electromagnetic radiation such as X-rays, UV radiation, visible light or near IR light (NIR), especially UV radiation, or corpuscular radiation such as electron beams.

Where accelerated electron beams are used, free radicals are generated from the powder coating composition in a number which ensures extremely rapid polymerization of the reactive acrylate groups. Preference is given to using radiation doses of from 5 to 15 Mrad. The radiation dose includes all values and subvalues therebetween, especially including 6, 7, 8, 9, 10, 11, 12, 13 and 14 Mrad.

In the case of UV curing, UV initiators are used as component III. They are known in principle from conventional liquid UV-curing systems, e.g. EP 633 912. These are substances which on irradiation with UV light break down into free radicals and so initiate the polymerization. Examples of suitable UV initiators include 2,2' diethoxyacetophenone, hydroxycyclohexyl phenyl ketone, benzophenone, 2-hydroxy-2-methyl-1-phenylpropan-1-one, xanthone, thioxanthone, benzil dimethyl ketal, etc. UV initiators of this kind are offered commercially, e.g., IRGACURE® 184 or DEGACURE® 1173 from Ciba. The amount of the UV initiator as a fraction of the system as a whole is approximately from 0.5 to 5% by weight. The amount of UV initiator includes all values and subvalues therebetween, especially including 1, 1.5, 2, 2.5, 3, 3.5, 4 and 4.5% by weight, based on the weight of the composition.

The use of photoinitiators, examples of which include thioxanthones, phosphine oxides, metallocenes, tertiary aminobenzenes, and tertiary aminobenzophenones, which break down into free radicals on irradiation with visible light is likewise possible.

Optional additives III are acrylate- or methacrylate-containing compounds, such as the triacrylate of tris(2-hydroxyethyl) isocyanurate (SR 386, Sartomer), for example, and adhesion promoters, which can be used in minor fractions of from 0 to 20% by weight in order to modify the coating properties. The amount of the optional additives includes all values and subvalues therebetween, especially including 2, 6, 8, 10, 12, 14, 16 and 18% by weight.

Further additives III customary in the case of powder coating materials include leveling agents, light stabilizers, and devolatilizers. They can be used at from 0 to 5% by weight. The amount of these additives III includes all values and subvalues therebetween, especially including 1, 1.5, 2, 2.5, 3, 3.5, 4 and 4.5% by weight. A further option is the use of pigments and fillers, examples being metal oxides such as titanium dioxide, and metal hydroxides, sulfates, sulfides, carbonates, silicates, talc, carbon black, etc., in weight fractions of from 0 to 50%. The amount of the pigments and/or fillers includes all values and subvalues therebetween, especially including 5, 10, 15, 20, 25, 30, 35, 40 and 45% by weight.

The ready-to-use powder coating composition is prepared by mixing the ingredients. The ingredients can be homogenized in suitable units, such as heatable kneading apparatus, for example, but preferably by extrusion, in which case upper temperature limits of from 120 to 130° C. ought not to be exceeded. After cooling to room temperature and appropriate comminution, the extruded mass is ground without addition of coolants to form the ready-to-spray powder. This ready-to-spray powder can be applied to appropriate substrates by the known techniques, such as by electrostatic or tribostatic powder spraying, or fluid-bed sintering, with or without electrostatic assistance. Examples of suitable substrates include untreated or pretreated metallic substrates, wood, wood materials, plastics, glass, and paper.

The present invention also provides coatings with low gloss and a textured surface, comprising a powder coating composition curable with actinic radiation and comprising I. from 30 to 98.5% by mass of a binder comprising at least one urethane (meth)acrylate having a melting point of from 40 to 130° C.;

II. from 1 to 20% by mass of at least one micronized wax; and

III. from 0.5 to 50% by mass of further auxiliaries and additives.

The amount of binder includes all values and subvalues therebetween, especially including 35, 40, 45, 50, 55, 60, 65, 70, 75, 80, 85, 90 and 95% by mass.

The melting point of the urethane acrylate includes all values and subvalues therebetween, especially including 45, 50, 55, 60, 65, 70, 75, 80, 85, 90, 95, 100, 105, 110, 115, 120 and 125° C.

The amount of micronized wax includes all values and subvalues therebetween, especially including 2, 4, 6, 8, 10, 12, 14, 16 and 18% by mass.

The amount of auxiliaries and additives includes all values and subvalues therebetween, especially including 1, 2, 3, 4, 5, 10, 15, 20, 25, 30 35, 40 and 45% by mass.

The coatings of the present invention produced from the powder coating compositions of the present invention are weather-stable and possess good adhesion, a low gloss, and a textured surface.

Having generally described this invention, a further understanding can be obtained by reference to certain specific examples which are provided herein for purposes of illustration only, and are not intended to be limiting unless otherwise specified.

EXAMPLES

1. Preparation of the Amorphous Urethane Acrylate 65 kg of isophthalic acid, 6 kg of monoethylene glycol, 19 kg of neopentyl glycol and 26 kg of cyclohexanedimethanol were admixed with 0.2 percent by mass of n butyltin trioctanoate and heated with stirring to 190° C. under nitrogen in an apparatus provided with a distillation column. This temperature was slowly raised to 230° C. as water was separated off. After about 98% of the theoretical amount of water had been removed by distillation the product was added in portions at 120° C., with vigorous stirring, to a mixture of 3.2 kg of a 1:1 adduct of IPDI and hydroxyethyl acrylate, 0.7 kg of IONOL CP and 0.2 kg of dibutyltin dilaurate. After about one hour of stirring the NCO content was below 0.1 %. The hot reaction mixture was poured from the flask onto a sheet. As soon as the reaction mass had solidified and cooled, it was mechanically comminuted and ground. The melting range of this product was from 82 to 86° C.

2. Preparation of the Crystalline Urethane Acrylate 230 kg of dodecanedoic acid and 66 kg of monoethylene glycol were admixed with 0.2 percent by mass of n butyltin trioctanoate and heated with stirring to 190° C. under nitrogen in an apparatus provided with a distillation column. This temperature was slowly raised to 230° C. as water was separated off. After about 98% of the theoretical amount of water had been removed by distillation the product was added in portions at 120° C., with vigorous stirring, to a mixture of 63 kg of a 1:1 adduct of IPDI and hydroxyethyl acrylate, 3.2 kg of IONOL CP and 0.6 kg of dibutyltin dilaurate. After about one hour of stirring the NCO content was below 0.1%. The hot reaction mixture was poured from the flask onto a sheet. As soon as the reaction mass had solidified and cooled, it was mechanically comminuted and ground. The melting point of this product was 77° C.

3. Preparation of the Inventive Powder Coating Composition 646 g of the amorphous urethane acrylate from Example 1 and 114 g of crystalline urethane acrylate from Example 2 were admixed with 10 g of Resiflow PV 88 (leveling agent, Worlée-Chemie), 10 g of Worlée Add 900 (devolatilizer, Worlée-Chemie), 10 g of Irgacure 2959 (photoinitiator, Ciba Specialty Chemicals), 20 g of Irgacure 819 (photoinitiator, Ciba Specialty Chemicals), 150 g of Kronos 2160 (white pigment, Kronos Titan) and 40 g Ceraflour 969 (micronized wax, Byk-Cera). The comminuted ingredients were intimately mixed in an edge runner mill and subsequently homogenized in an extruder at up to 130° C. maximum. After cooling, the extrudate was fractionated and ground with a pinned-disk mill, with addition of coolants (liquid nitrogen or dry ice) in the case of the comparative experiment but without them in the case of the inventive example), to a particle size <100 µm. The powder thus prepared was applied to degreased aluminum panels using an electrostatic powder spraying unit at 60 kV. The applied powder was then melted under IR irradiation and cured using UV radiation (gallium-doped lamp, approx. 4700 mJ/cm$^2$).

4. Preparation of the Inventive Powder Coating Composition

The powder coating composition was prepared in the same way as for the inventive powder coating composition of Example 3 but using Lanco® 1840 instead of Ceraflour® 969.

5. Preparation of the Powder Coating Composition Without Micronized Wax (Comparative)

The powder coating composition was prepared in the same way as for the inventive powder coating compositions from Examples 3 and 4 but without the addition of the micronized wax.

The test values are summarized in Table 1:

TABLE 1

| Experiment | Micronized wax | Substrate | Gloss[1] 60° [s.d.] | CC[2] | Surface |
|---|---|---|---|---|---|
| 3 | 100 A1U | Alu 46 | 20 | 0-1 | fine, uniform structure |
| 4 | 100 A2U | Alu 46 | 32 | 0 | fine, uniform structure |
| 5 (comparative) | no wax | Alu 46 | 80 | 0 | smooth |

[1]Gardner gloss at 60° angle (ASTM-D 5233)
[2]Cross-cut (DIN EN ISO 2409)
(Scale 0 (no loss of adhesion) to 5 (total loss of adhesion))

Only the inventive experiments 3 and 4 show a low gloss and a textured surface in the coating. The adhesion remains at a very good level. The noninventive, comparative Example 5, on the other hand, possesses a glossy and smooth film surface.

German patent application 10346118.3 filed Oct. 4, 2003, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A powder coating composition, comprising:
   I. from 30 to 98.5% by mass of a binder comprising at least one urethane (meth)acrylate having a melting point of from 40 to 130° C.;
   II. from 1 to 20% by mass of at least one micronized wax; and
   III. from 0.5 to 50% by mass of at least one auxiliary and/or at least one additive;
   wherein said composition is curable with actinic radiation.

2. The powder coating composition as claimed in claim 1, wherein component I comprises a hydroxyl-containing polymer to which urethane groups and (meth)acrylate groups are attached by reaction with i) diisocyanates and/or polyisocyanates and ii) (meth)acrylate-containing alcohols.

3. The powder coating composition as claimed in claim 1, wherein component I is amorphous.

4. The powder coating composition as claimed in claim 1, wherein component I is (semi)crystalline.

5. The powder coating composition as claimed in claim 1, wherein component I comprises a mixture of amorphous and (semi)crystalline urethane (meth)acrylates.

6. The powder coating composition as claimed in claim 1, wherein component II comprises a pulverulent product having a melting point of at least 40° C.

7. The powder coating composition as claimed in claim 1, wherein component II has an average particle size distribution $d_{50}$ of less than 50 μm.

8. The powder coating composition as claimed in claim 1, wherein component II has a $d_{50}$ of less than 10 μm.

9. The powder coating composition as claimed in claim 1, wherein component II comprises at least one member selected from the group consisting of polyamides, polyethylenes, polytetrafluoroethylenes, and polypropylenes.

10. The powder coating composition as claimed in claim 1, wherein component II comprises a mixture of at least one polyethylene and at least one polytetrafluoroethylene.

11. The powder coating composition as claimed in claim 1, wherein component III comprises at least one member selected from the group consisting of photoinitiators, leveling agents, light stabilizers, devolatilizers, pigments, fillers, and adhesion promoters.

12. A method of preparing a powder coating composition, comprising:
mixing
I. from 30 to 98.5% by mass of a binder comprising at least one urethane (meth)acrylate having a melting point of from 40 to 130° C.;
II. from 1 to 20% by mass of at least one micronized wax; and
III. from 0.5 to 50% by mass of at least one auxiliary and/or at least one additives;
wherein said powder coating composition is curable with actinic radiation.

13. The method as claimed in claim 12, wherein component I is synthesized by reacting at least one hydroxyl-containing polymer with i) at least one diisocyanate and/or polyisocyanate and ii) at least one (meth)acrylate-containing alcohol.

14. The method as claimed in claim 12, wherein component I is amorphous.

15. The method as claimed in claim 12, wherein component I is (semi)crystalline.

16. The method as claimed in claim 12, wherein component I comprises a mixture of amorphous and (semi)crystalline urethane (meth)acrylates.

17. The method as claimed in claim 12, wherein component II comprises a pulverulent product having a melting point of at least 40° C.

18. The method as claimed in claim 12, wherein component II has an average particle size distribution $d_{50}$ of less than 50 μm.

19. The method as claimed in claim 12, wherein component II has a $d_{50}$ of less than 10 μm.

20. The method as claimed in claim 12, wherein component II comprises at least one member selected from the group consisting of polyamides, polyethylenes, polytetrafluoroethylenes, and polypropylenes.

21. The method as claimed in claim 12, wherein component II comprises a mixture of at least one polyethylene and at least one polytetrafluoroethylene.

22. The method as claimed in claim 12, wherein component III comprises at least one member selected from the group consisting of photoinitiators, leveling agents, light stabilizers, devolatilizers, pigments, fillers, and adhesion promoters.

23. The method as claimed in claim 12, wherein said mixing proceeds at a temperature of from 40 to 150° C.

24. The method as claimed in claim 12, wherein an upper temperature limit of between 120° C. and 150° C. is observed, in a heatable kneading apparatus.

25. A coating, comprising:
the powder coating composition according to claim 1.

26. The coating according to claim 25, which is a light-stable and weather-stable coating having good adhesion, low gloss, and a textured surface.

27. A method of coating a substrate, comprising:
coating said substrate with the powder coating composition according to claim 1.

* * * * *